(12) United States Patent
Koike

(10) Patent No.: US 12,216,867 B2
(45) Date of Patent: Feb. 4, 2025

(54) ELECTRONIC PEN, INPUT SYSTEM, AND PEN PRESSURE ADJUSTMENT METHOD

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/361,581

(22) Filed: Jul. 28, 2023

(65) Prior Publication Data

US 2024/0111386 A1 Apr. 4, 2024

(30) Foreign Application Priority Data

Sep. 30, 2022 (JP) ................................. 2022-158091

(51) Int. Cl.
*G06F 3/044* (2006.01)
*G06F 3/0354* (2013.01)
*G06F 3/041* (2006.01)
*G06F 3/038* (2013.01)

(52) U.S. Cl.
CPC ........ *G06F 3/0441* (2019.05); *G06F 3/03545* (2013.01); *G06F 3/04162* (2019.05); *G06F 3/0418* (2013.01); *G06F 3/0383* (2013.01); *G06F 3/0442* (2019.05); *G06F 2203/04108* (2013.01)

(58) Field of Classification Search
CPC ............... G06F 3/0441; G06F 3/04162; G06F 3/03545; G06F 3/0418; G06F 2203/04108; G06F 3/0383; G06F 3/0442
USPC ......................................................... 345/156
See application file for complete search history.

(56) References Cited

U.S. PATENT DOCUMENTS

| 5,111,004 A | * | 5/1992 | Gullman | B43K 7/005 |
| | | | | 382/121 |
| 7,629,966 B2 | * | 12/2009 | Anson | G06F 3/0488 |
| | | | | 345/157 |
| 11,163,396 B2 | | 11/2021 | Perez et al. | |
| 2013/0307829 A1 | * | 11/2013 | Libin | G06F 3/016 |
| | | | | 345/179 |
| 2015/0160851 A1 | * | 6/2015 | Michihata | G06F 3/03545 |
| | | | | 345/174 |
| 2017/0123568 A1 | * | 5/2017 | Takeda | G06F 3/0442 |
| 2018/0203559 A1 | * | 7/2018 | Choi | G06F 3/04883 |
| 2018/0341400 A1 | * | 11/2018 | Kim | G06F 3/04883 |
| 2019/0018520 A1 | * | 1/2019 | Kuo | G06F 3/0441 |

(Continued)

*Primary Examiner* — Tom V Sheng
(74) *Attorney, Agent, or Firm* — Seed IP Law Group LLP

(57) ABSTRACT

An electronic pen is provided which indicates a position on a plane-shaped sensor through communication with an electronic device including the plane-shaped sensor. The electronic pen includes a reception circuit configured to receive a signal transmitted from the electronic device, a pen pressure sensor configured to output a detection signal correlated with an amount of pen pressure exerted on a pen tip of the electronic pen, and a value conversion circuit configured to convert, according to a conversion rule, a detection value indicated by the detection signal output from the pen pressure sensor, into a conversion value indicating a magnitude of the amount of pen pressure. The value conversion circuit adjusts, according to a strength of the signal received by the reception circuit, rising sensitivity at which the amount of pen pressure transitions from zero to non-zero on a conversion characteristic curve identified by the conversion rule.

14 Claims, 10 Drawing Sheets

(56) References Cited

U.S. PATENT DOCUMENTS

| | | | |
|---|---|---|---|
| 2022/0276729 A1* | 9/2022 | Gutierrez | G06F 3/038 |
| 2023/0051541 A1* | 2/2023 | Kim | G06F 3/04166 |
| 2023/0324247 A1* | 10/2023 | Mori | G06F 3/03545 |
| | | | 73/1.01 |
| 2023/0359289 A1* | 11/2023 | Lee | G06F 3/016 |

* cited by examiner

F I G . 3
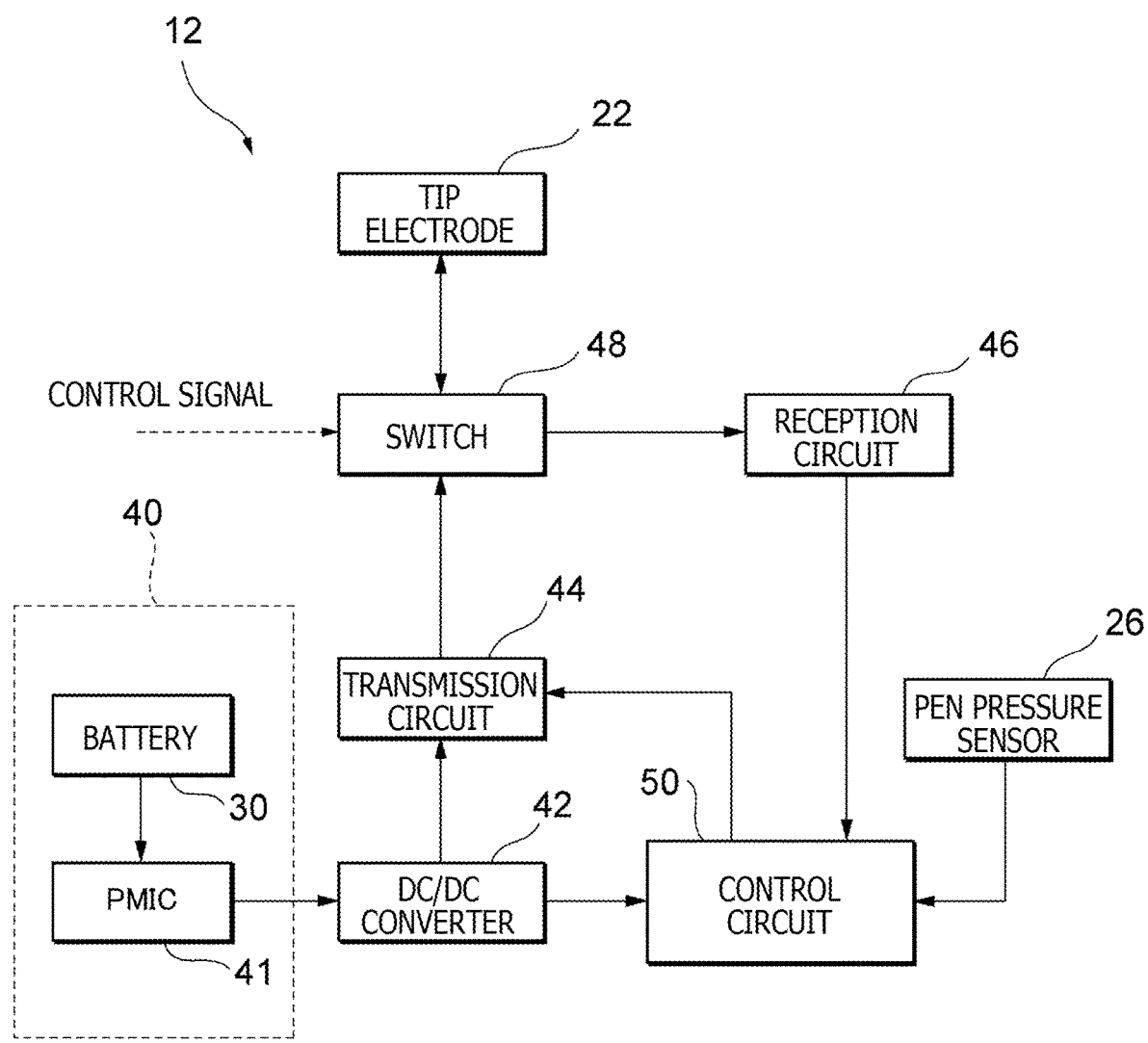

F I G . 7
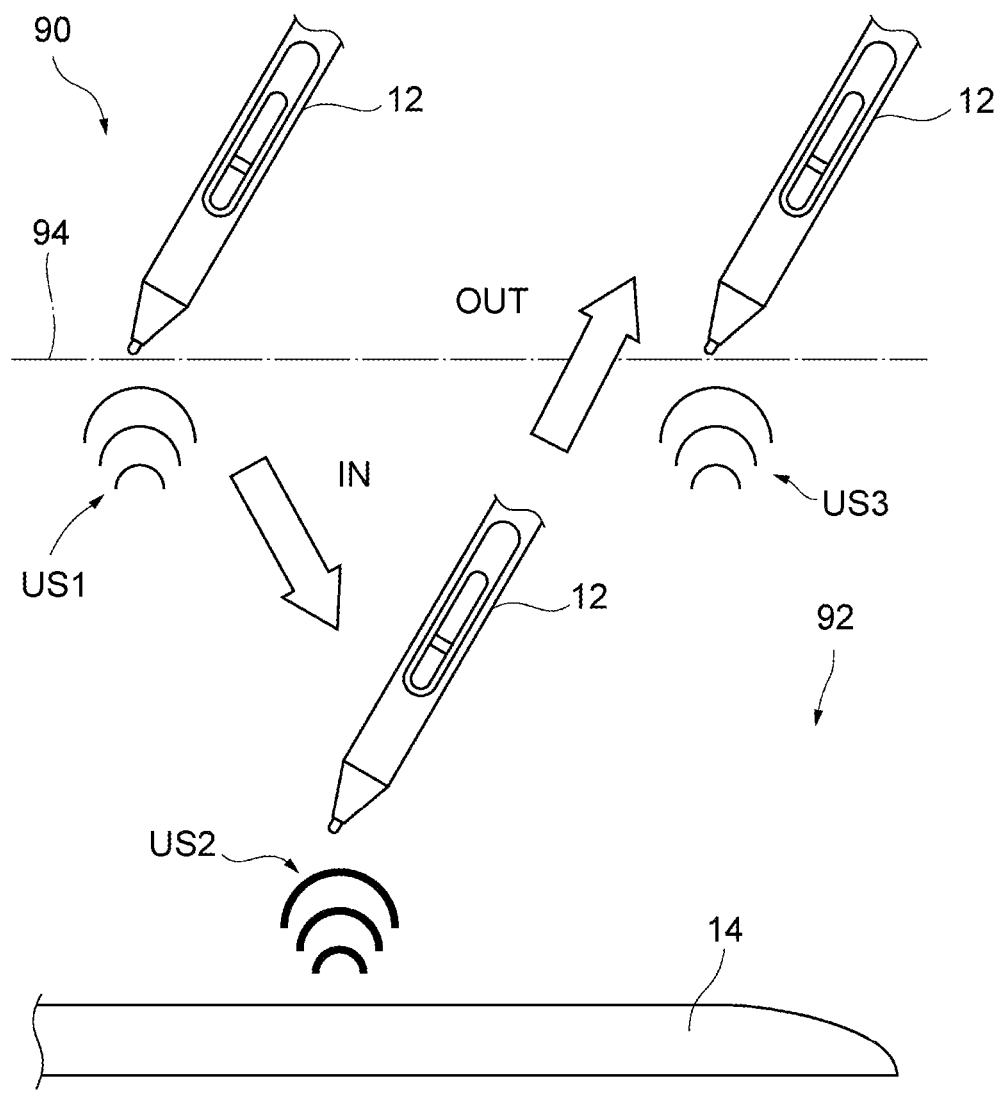

ELECTRONIC PEN, INPUT SYSTEM, AND PEN PRESSURE ADJUSTMENT METHOD

BACKGROUND

Technical Field

The present disclosure relates to an electronic pen, an input system, and a pen pressure adjustment method.

Description of the Related Art

Conventionally, input systems have been known that include an electronic pen (or a stylus), which is a position indicator, and an electronic device including a touch sensor. In this type of systems, a pen pressure sensor disposed on a pen tip of the electronic pen detects the amount of pen pressure exerted on the pen tip, and the amount of pen pressure is used for ink rendering that simulates the writing feel of conventional handwriting.

Even when the electronic pen is in a hovering state, a positive amount of pen pressure may be detected by the pen pressure sensor due, for example, to malfunction, friction, or wear of the pen pressure sensor. Therefore, various methods have been proposed to prevent unwanted ink rendering when the amount of pen pressure inconsistent with the hovering state is detected.

U.S. patent Ser. No. 11/163,396 (hereinafter referred to as "Patent Document 1") discloses an electronic pen that receives a signal transmitted from a touch device through first and second antennas, determines the distance to the touch device based on the received signal, and transmits a command signal to the touch device to cause the touch device to perform ink rendering according to the distance.

However, with the method disclosed in Patent Document 1, the electronic pen itself sequentially determines the distance and determines whether or not to allow ink rendering. Accordingly, in some cases, the electronic pen needs to implement different determination processes according to software or hardware specifications of the particular electronic device.

BRIEF SUMMARY

According to one aspect, an electronic pen, an input system, and a pen pressure adjustment method are provided, which can suppress unwanted ink rendering in a hovering state in a manner that is not affected by specifications of an electronic device that performs ink rendering.

An electronic pen according to the present disclosure is a pen that indicates a position on a plane-shaped sensor through communication with an electronic device including the plane-shaped sensor. The electronic pen includes a reception circuit configured to receive a signal transmitted from the electronic device, a pen pressure sensor configured to output a detection signal correlated with an amount of pen pressure exerted on a pen tip of the electronic pen, and a value conversion circuit configured to convert, according to a conversion rule, a detection value indicated by the detection signal output from the pen pressure sensor, into a conversion value indicating a magnitude of the amount of pen pressure. The value conversion circuit adjusts, according to a strength of the signal received by the reception circuit, rising sensitivity at which the amount of pen pressure transitions from zero to non-zero on a conversion characteristic curve identified by the conversion rule.

An input system according to the present disclosure includes an electronic device including a plane-shaped sensor, and an electronic pen that indicates a position on the plane-shaped sensor through communication with the electronic device. The electronic pen includes a reception circuit configured to receive a signal transmitted from the electronic device, a pen pressure sensor configured to output a detection signal correlated with an amount of pen pressure exerted on a pen tip of the electronic pen, and a value conversion circuit configured to convert, according to a conversion rule, a detection value indicated by the detection signal output from the pen pressure sensor, into a conversion value indicating a magnitude of the amount of pen pressure. The value conversion circuit adjusts, according to a strength of the signal received by the reception circuit, rising sensitivity at which the amount of pen pressure transitions from zero to non-zero on a conversion characteristic curve identified by the conversion rule.

A pen pressure adjustment method according to the present disclosure is a method related to an electronic pen that indicates a position on a plane-shaped sensor through communication with an electronic device including the plane-shaped sensor. The pen pressure adjustment method includes, by the electronic pen, receiving a signal transmitted from the electronic device, outputting a detection signal correlated with an amount of pen pressure exerted on a pen tip of the electronic pen, converting, according to a conversion rule, a detection value indicated by the output detection signal into a conversion value indicating a magnitude of the amount of pen pressure, and adjusting, according to a strength of the received signal, rising sensitivity at which the amount of pen pressure transitions from zero to non-zero on a conversion characteristic curve identified by the conversion rule.

According to the present disclosure, unwanted ink rendering in a hovering state can be suppressed in a manner that is not affected by specifications of the electronic device that performs ink rendering.

BRIEF DESCRIPTION OF THE SEVERAL VIEWS OF THE DRAWINGS

FIG. 3 is an electrical block diagram of the electronic pen illustrated in FIGS. 1 and 2;

FIG. 7 is a diagram illustrating an example of temporal variation of the position of the electronic pen when the electronic pen is in use;

DETAILED DESCRIPTION

An embodiment of the present disclosure is described below with reference to the accompanying drawings. The same constituent components are denoted with the same signs in each drawing as much as possible to facilitate understanding of the description, and redundant description is omitted.

Configuration of Electronic Pen 12
Overall Configuration of Input System 10

Figure 1:
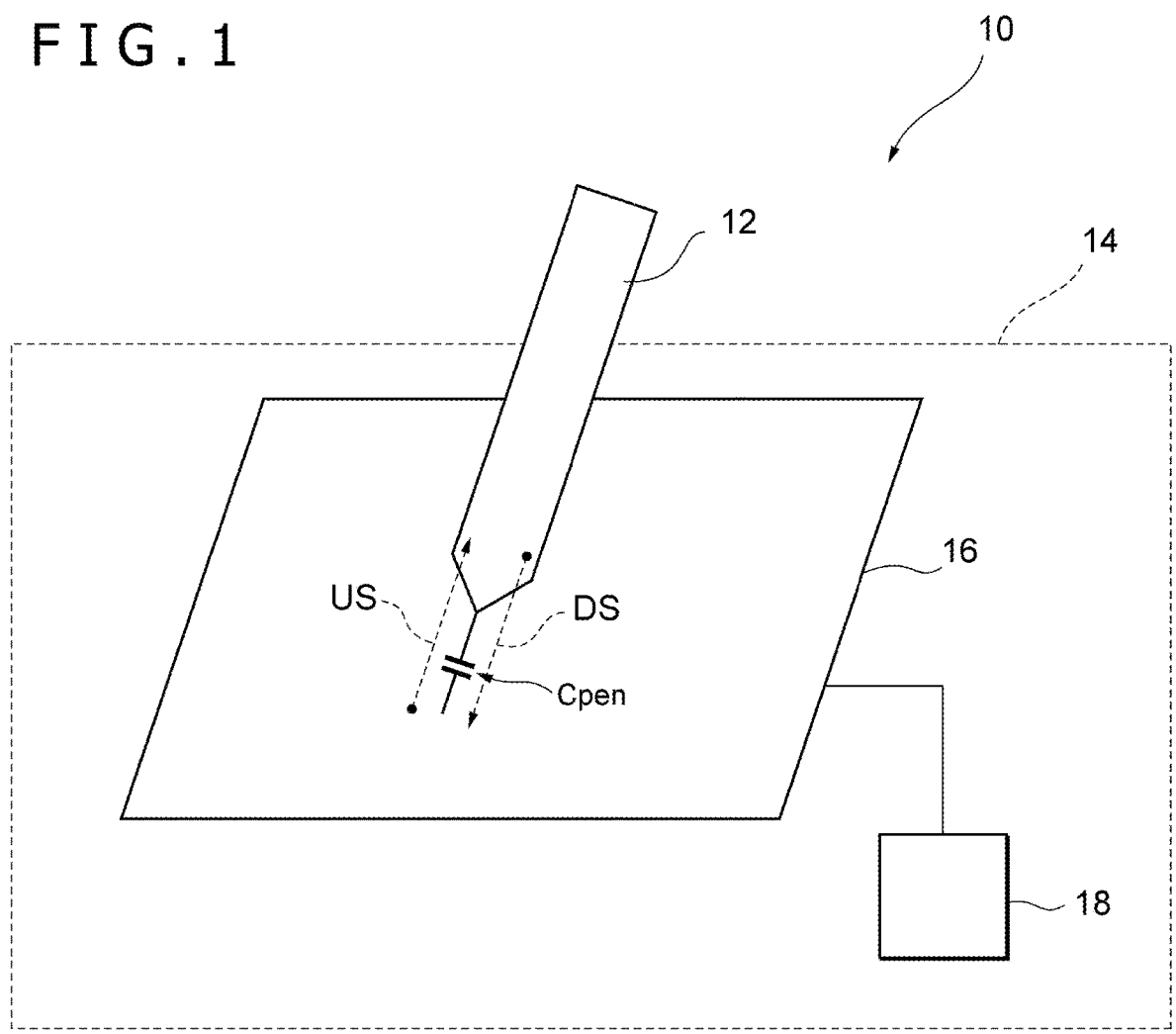
FIG. 1 is a diagram illustrating an overall configuration of an input system according to an embodiment of the present disclosure.

FIG. 1 is a diagram illustrating an overall configuration of an input system 10 in which an electronic pen 12 according to an embodiment of the present disclosure is incorporated. The input system 10 can provide a "digital ink service" in which content handwritten by a user is processed as digital data. The input system 10 specifically includes the electronic pen 12 and an electronic device 14 which is used together with the electronic pen 12.

The electronic pen 12 is a pen-type pointing device and can perform one-way or two-way communication with the electronic device 14. In the present embodiment, the electronic pen 12 is an active electrostatic (AES) stylus. The electronic pen 12 and the electronic device 14 are capacitively coupled to each other by a capacitance Cpen.

The electronic device 14 is a user-owned computer and includes, for example, a tablet, a smartphone, a personal computer, or the like. Specifically, the electronic device 14 includes a host processor, a memory, a communication module, or a display panel (all not illustrated), in addition to a plane-shaped sensor 16 and a sensor controller 18. The host processor uses position data sequentially output from the sensor controller 18 to perform, for example, a process of generating digital ink and a process of displaying a pointer.

The plane-shaped sensor 16 is, for example, a capacitive touch sensor including a plurality of detection electrodes arranged in a plane shape. The plane-shaped sensor 16 includes, for example, a plurality of X line electrodes for detecting an X-axis position in a sensor coordinate system and a plurality of Y line electrodes for detecting a Y-axis position in the sensor coordinate system. Each line electrode may include a transparent conductive material including indium tin oxide (ITO) or may include a wire mesh sensor. Instead of the mutual capacitive sensor described above, the plane-shaped sensor 16 may be a self-capacitive sensor in which block-shaped electrodes are arranged in a two-dimensional grid.

The sensor controller 18 is connected to the plane-shaped sensor 16 and is a control circuit for controlling communication with the electronic pen 12 via the plane-shaped sensor 16. Specifically, the sensor controller 18 transmits an uplink signal US to the electronic pen 12 and receives a downlink signal DS from the electronic pen 12, thereby detecting the position indicated by the electronic pen 12.

Configuration of Electronic Pen 12

Figure 2:
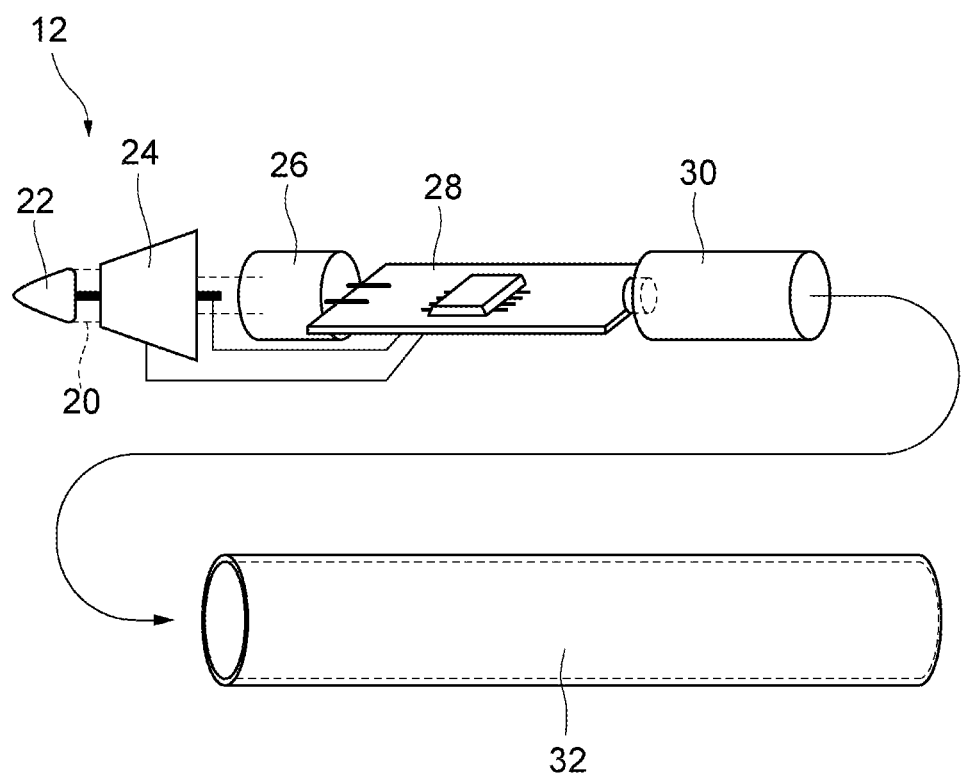
FIG. 2 is a view schematically illustrating an internal structure of an electronic pen illustrated in FIG. 1.

FIG. 2 is a view schematically illustrating an internal structure of the electronic pen 12 illustrated in FIG. 1. The electronic pen 12 includes an axial member 20, a tip electrode 22, a ring electrode 24, a pen pressure sensor 26, a circuit board 28, a battery 30, and a casing 32.

The axial member 20 is a rod-shaped member disposed along a pen axis of the electronic pen 12. Each of the tip electrode 22 and the ring electrode 24 is made of a conductive material such as metal or includes a conductive material. Specifically, the tip electrode 22 is a conical-shaped electrode attached to a tip of the axial member 20. The ring electrode 24 is a tapered ring-shaped electrode whose diameter gradually decreases toward the tip.

The pen pressure sensor 26 is physically connected to the axial member 20 and can detect the amount of pen pressure exerted on the tip side (i.e., pen tip) of the axial member 20. For example, the pen pressure sensor 26 employs, as a detection method, a capacitive system, a film resistance system, a piezoelectric element system, an optical system, or a micro electro-mechanical system (MEMS).

The circuit board 28 is a board that constitutes an electric circuit for operating the electronic pen 12. The battery 30 is a power supply that supplies drive power to electronic components or electronic elements disposed on the circuit board 28. The casing 32 can accommodate each of the above-described constituent components.

FIG. 3 is an electrical block diagram of the electronic pen 12 illustrated in FIGS. 1 and 2. In addition to the tip electrode 22 and the pen pressure sensor 26 (FIG. 2) described above, the electronic pen 12 includes a power supply circuit 40, a direct current (DC)/DC converter 42, a transmission circuit 44, a reception circuit 46, a switch 48, and a control circuit 50. For the convenience of description, the configuration and electrical connection relation of the ring electrode 24 are not illustrated in FIG. 3.

The power supply circuit 40 generates a drive voltage for the electronic pen 12 and outputs the resulting DC voltage to the DC/DC converter 42. Specifically, the power supply circuit 40 includes the battery 30 (FIG. 2) described above and a power management integrated circuit (IC) (hereinafter referred to as a "PMIC 41") that controls the power management of the battery 30.

The DC/DC converter 42 converts the DC voltage input from the power supply circuit 40, into a DC voltage suitable for each circuit, and then outputs the DC voltage to the transmission circuit 44 and the control circuit 50.

The transmission circuit 44 is a circuit that generates the downlink signal DS and then outputs the downlink signal DS to the switch 48 and the tip electrode 22. Specifically, the transmission circuit 44 includes an oscillation circuit that generates a carrier signal oscillating at a predetermined frequency and a modulation circuit that modulates the carrier signal with use of data included in a control signal from the control circuit 50.

The reception circuit 46 is a circuit that acquires the uplink signal US via the tip electrode 22 and the switch 48 and then outputs the uplink signal US to the control circuit 50. Specifically, the reception circuit 46 includes an analog circuit including an amplification circuit and an analog-to-digital (AD) conversion circuit, and a digital circuit including a matched filter and a data restoring section.

The switch 48 is disposed in such a manner that an input terminal is connected to the tip electrode 22, a first output terminal is connected to the transmission circuit 44, and a second output terminal is connected to the reception circuit 46. The switch 48 selectively connects the tip electrode 22 to the transmission circuit 44 or the reception circuit 46.

The control circuit 50 is a microcomputer that performs control including an operation of transmitting the downlink signal DS and an operation of receiving the uplink signal US. Through the control of each unit, the control circuit 50 receives inputs of the uplink signal US from the reception circuit 46 and a detection signal from the pen pressure sensor 26, and outputs the downlink signal DS to the transmission circuit 44 and a control signal to the switch 48.

Functional Block Diagram of Control Circuit 50

Figure 4:
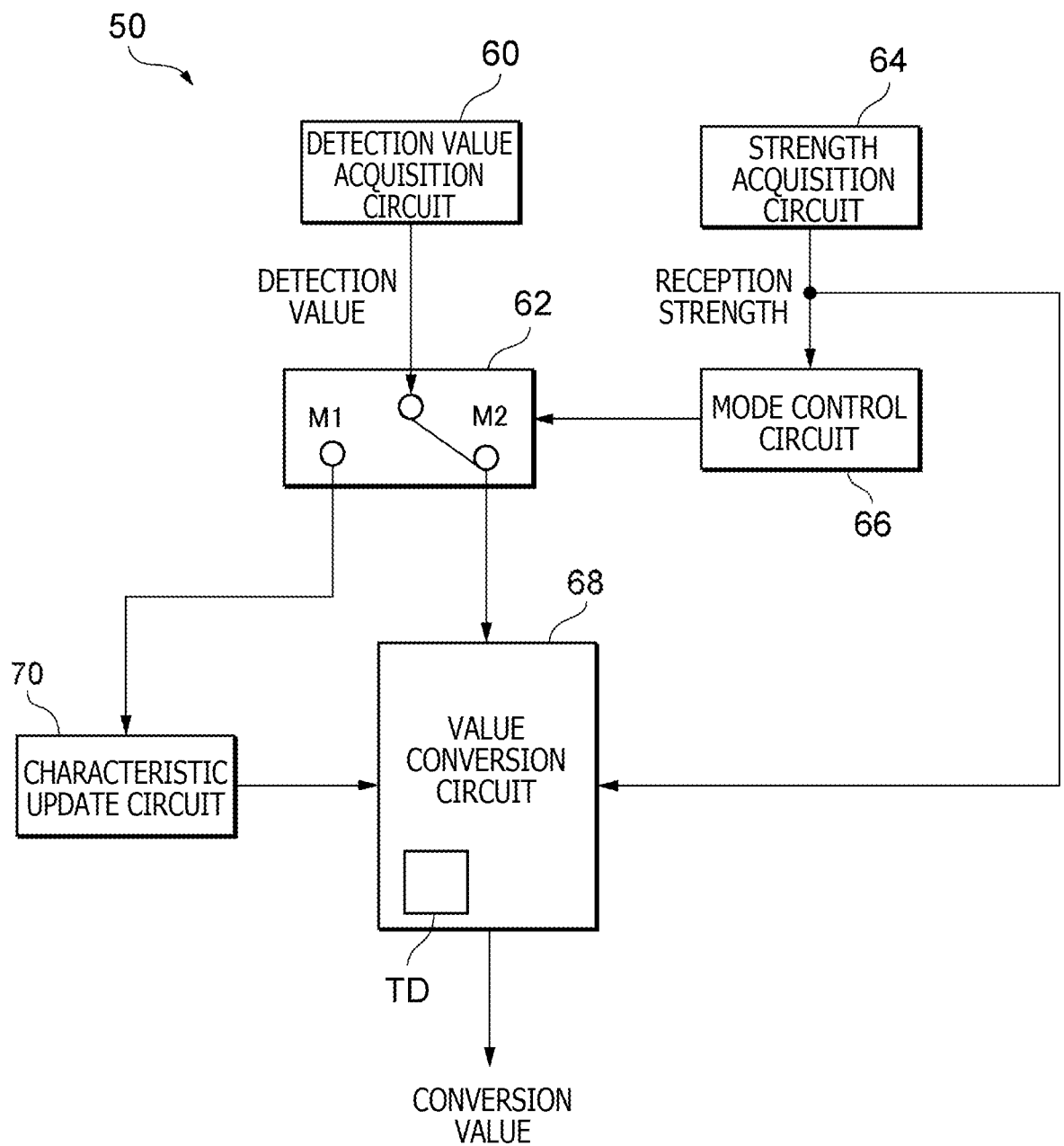
FIG. 4 is a functional block diagram of a control circuit illustrated in FIG. 3.

FIG. 4 is a functional block diagram of the control circuit 50 illustrated in FIG. 3. The control circuit 50 functions as (includes) a detection value acquisition circuit 60, a mode switch 62, a strength acquisition circuit 64, a mode control circuit 66, a value conversion circuit 68, and a characteristic update circuit 70.

The detection value acquisition circuit 60 processes the detection signal output from the pen pressure sensor 26 (FIGS. 2 and 3) to acquire a detection value correlated with the amount of pen pressure. The number of quantization bits of the detection value is determined by specifications of an analog-to-digital converter (ADC).

The mode switch 62 is a switch having an input terminal connected to the detection value acquisition circuit 60, an output terminal M1 connected to the characteristic update circuit 70, and an output terminal M2 connected to the value conversion circuit 68. The mode switch 62 causes the detection value acquired by the detection value acquisition circuit 60 to selectively be supplied to the value conversion circuit 68 or the characteristic update circuit 70.

The strength acquisition circuit 64 acquires strength (hereinafter also referred to as "reception strength") of the uplink signal US received via the reception circuit 46 illustrated in FIG. 3. This reception strength is supplied to the mode control circuit 66 and the value conversion circuit 68.

The mode control circuit 66 performs control for switching execution between [1] a "conversion mode" and [2] an "update mode." In the conversion mode, a process of converting the detection value is performed and the conversion value is output. In the update mode, a conversion rule for the detection value is updated. Specifically, the mode control circuit 66 performs switch control to switch the output destination of the mode switch 62, based on the reception strength supplied from the strength acquisition circuit 64.

The mode control circuit 66 outputs a command signal for switching the execution mode from the "conversion mode" to the "update mode" when, for example, the mode control circuit 66 has detected the start of a communication session with the electronic device 14 by analyzing temporal variation of the reception strength. The mode control circuit 66 outputs a command signal for switching the execution mode from the "update mode" to the "conversion mode" when, for example, the mode control circuit 66 has accepted a notification indicating that update of a conversion characteristic curve 84 has been completed or when, for example, a limited period of time has elapsed since the mode control circuit 66 switched the execution mode to the "update mode."

The value conversion circuit 68 converts, according to the conversion rule, the detection value acquired by the detection value acquisition circuit 60 into the conversion value indicating the magnitude of the amount of pen pressure. This conversion rule is described by conversion data TD set in the value conversion circuit 68. More specifically, the conversion rule is expressed by a function (hereinafter also referred to as the "conversion characteristic curve 84") on a coordinate system with a first axis as the detection value and a second axis as the conversion value. Here, the conversion characteristic curve 84 is a continuous function including one or more lines, one or more curves, or a combination thereof.

Each time the conversion data TD is updated through the characteristic update circuit 70, the value conversion circuit 68 performs a conversion process according to a new conversion rule described by the conversion data TD. An operation process that realizes this conversion process includes a function operation, a look-up table (LUT) operation, a clipping operation, a bit shift operation, offset adjustment, gain adjustment, or a combination thereof.

Each of the detection value and the conversion value is defined such that, as the value increases, the amount of pen pressure increases. In particular, in the case where the conversion value is defined such that the amount of pen pressure increases linearly as the conversion value increases, the electronic device 14 can perform ink rendering that is closer to conventional (analog-like) ink rendering, since correlation with the actual amount of pen pressure becomes higher.

The value conversion circuit 68 may dynamically adjust the shape of the conversion characteristic curve 84 (FIG. 10) identified by the conversion rule, according to the reception strength acquired by the strength acquisition circuit 64. Specifically, the value conversion circuit 68 may adjust rising sensitivity at which the amount of pen pressure transitions from zero to non-zero on a conversion characteristic curve 84, 85, or 86, according to the reception strength described above. For example, the value conversion circuit 68 may relatively increase the rising sensitivity as the reception strength increases, while relatively decreasing the rising sensitivity as the reception strength decreases.

The value conversion circuit 68 may, for example, adjust the rising sensitivity by moving, along the first axis (i.e., the axis related to the detection value), the position of a point (hereinafter referred to as an "inflection point") at which the amount of pen pressure transitions from zero to non-zero. In this case, moving the position of the inflection point closer to the origin increases the rising sensitivity, while moving the position of the inflection point away from the origin decreases the rising sensitivity.

The value conversion circuit 68 may, for example, adjust the rising sensitivity by changing the slope at the point (i.e., the inflection point) at which the amount of pen pressure transitions from zero to non-zero. In this case, increasing the slope at the inflection point increases the rising sensitivity, while decreasing the slope at the inflection point decreases the rising sensitivity.

The characteristic update circuit 70 updates the conversion characteristic curve 84 (FIG. 10) used in the conversion process performed by the value conversion circuit 68. Specifically, the characteristic update circuit 70 generates the conversion data TD describing the conversion characteristic curve 84, with use of the detection value acquired by the detection value acquisition circuit 60, and supplies the conversion data TD to the value conversion circuit 68. The data format of this conversion data TD is defined according to the type of operation performed during the conversion process.

The timing for updating the conversion characteristic curve 84 may be periodic or irregular. An example of the former is when a planned update timing (e.g., every month) arrives. An example of the latter is when a communication session with the electronic device 14 has started or when an update indication operation by the user has been accepted.

The characteristic update circuit 70 may also acquire a plurality of sample values, each of which is a sample of the detection value, from the detection value acquisition circuit 60 and determine the conversion characteristic curve 84, 85, or 86 based on statistics related to the plurality of sample values. The number of samples may be various values as long as the number of pieces of data is statistically significant. An example of statistics includes an average value, a maximum value, a minimum value, a mode value, or a median value.

In the case where the conversion characteristic curve 84 is expressed on the coordinate system with the detection value as the first axis and the conversion value as the second axis, the detection value corresponding to the inflection point described above may be determined to be equal to or greater than the maximum value of the plurality of sample values, regardless of the reception strength.

The shape of the conversion characteristic curve 84 may be determined based on the maximum value of the reception strength acquired in the past. Here, the "reception strength acquired in the past" means the reception strength acquired in a plurality of communication sessions performed in the past with the same electronic device 14, without limiting to the reception strength acquired in the current communication session. For example, the shape of the conversion characteristic curve 84 may be determined such that the maximum value of the reception strength is associated with the minimum value of the plurality of sample values each related to the detection value.

The timing for acquiring sample values may be any time during which the pen pressure sensor 26 can detect the amount of pen pressure, but it is more preferable to acquire sample values immediately before updating the conversion characteristic curve 84. Specifically, the sample values may be acquired [1] while the strength of the received signal is less than a threshold value or [2] upon the start of a communication session with the electronic device 14.

Operation of Electronic Pen 12

The electronic pen 12 according to the present embodiment is configured as described above. The operation of the electronic pen 12 (more specifically, the operation related to pen pressure adjustment) is described with reference to FIGS. 5 to 12.

1. Description of Conversion Characteristic Curve 84

Figure 5:
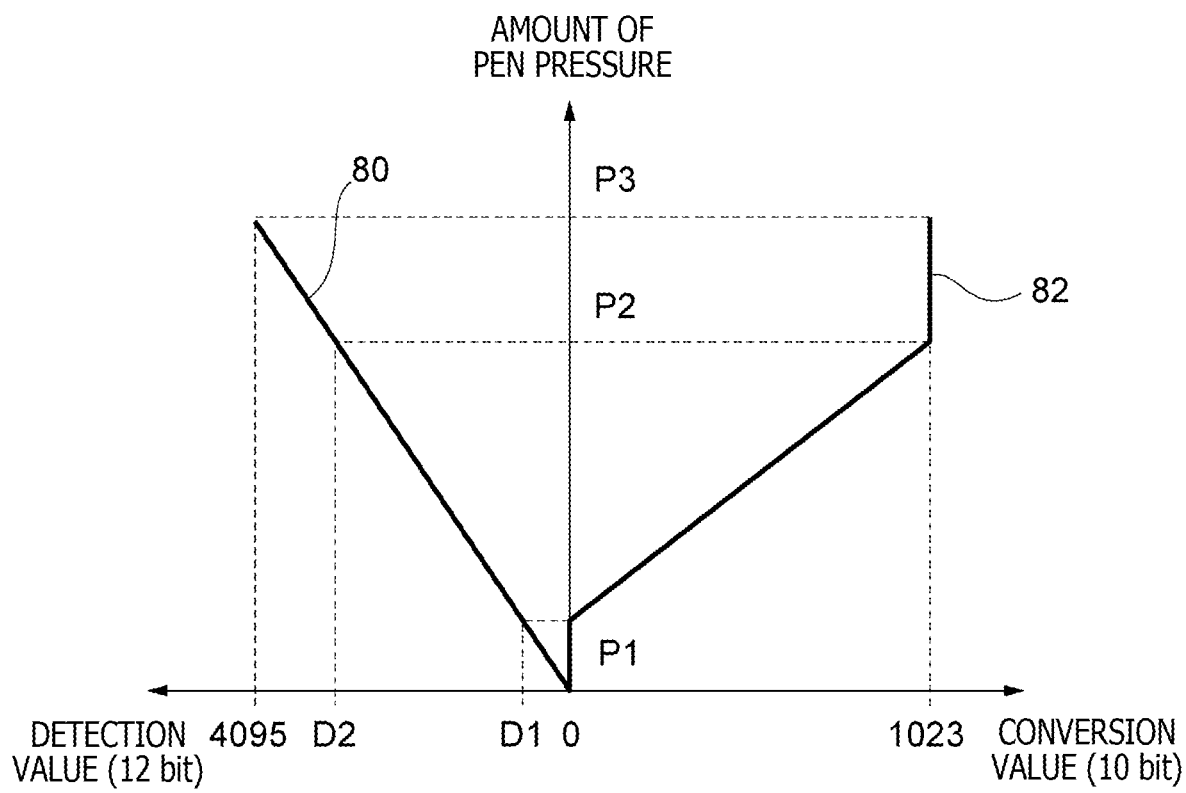
FIG. 5 is a diagram illustrating an example of a correspondence relation among a detection value, a conversion value, and the amount of pen pressure.

FIG. 5 is a diagram illustrating an example of a correspondence relation among a detection value, a conversion value, and the amount of pen pressure. The first axis extending to the left of the graph indicates a 12-bit detection value (0 to 4095). The second axis extending upward in the graph indicates the amount of pen pressure (unit: freely selectable, e.g., gf). The third axis extending to the right of the graph indicates a 10-bit conversion value (0 to 1023). The number of quantization bits of the detection value or the conversion value is not limited to the example illustrated in FIG. 5.

A first characteristic curve 80 is a curve related to the first axis (detection value) and the second axis (amount of pen pressure). In the example illustrated in FIG. 5, the first characteristic curve 80 exhibits a relation in which [1] the first characteristic curve 80 passes through the origin (0, 0) and [2] the amount of pen pressure increases generally linearly with respect to the detection value.

A second characteristic curve 82 is a curve related to the second axis (amount of pen pressure) and the third axis (conversion value). In the example illustrated in FIG. 5, the second characteristic curve 82 exhibits a relation in which [1] the conversion value is constant (minimum value=0) when the amount of pen pressure is equal to or less than P1, [2] the conversion value increases linearly when the amount of pen pressure exceeds P1, and [3] the conversion value is constant (maximum value=1023) when the amount of pen pressure is equal to or greater than P2. Here, the amount of pen pressure P1 corresponds to a detection value D1. The amount of pen pressure P2 corresponds to each of a detection value D2 and the maximum value (1023) of the conversion value. The amount of pen pressure P3 corresponds to each of the maximum value (4095) of the detection value and the maximum value (1023) of the conversion value.

Figure 6:
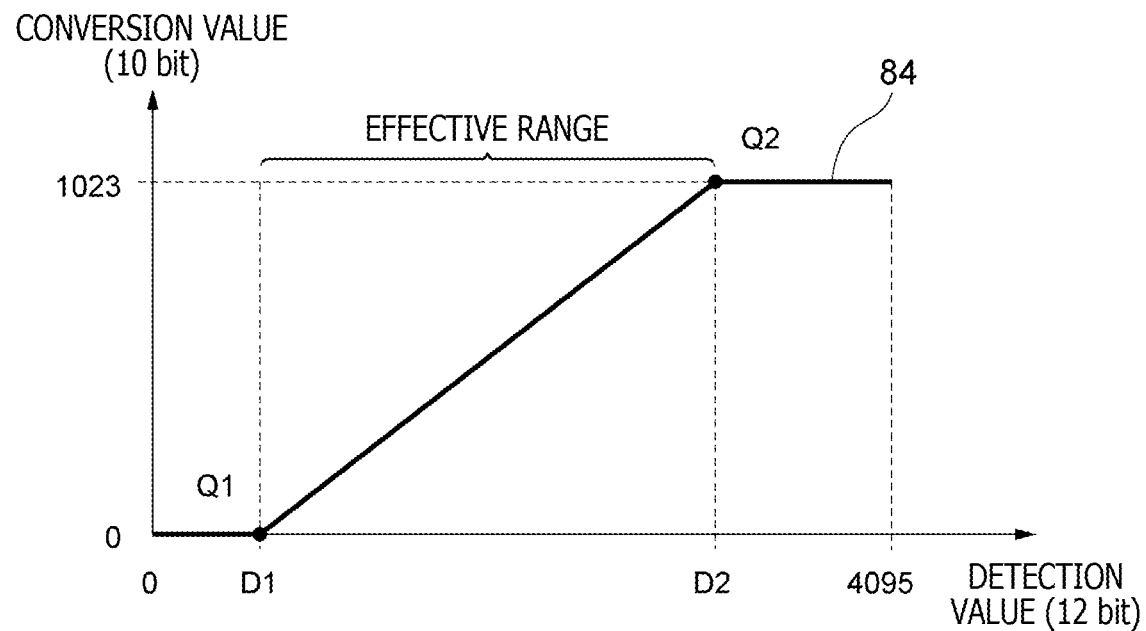
FIG. 6 is a diagram illustrating a conversion characteristic curve in the correspondence relation illustrated in FIG. 5.

FIG. 6 is a diagram illustrating the conversion characteristic curve 84 in the correspondence relation illustrated in FIG. 5. More specifically, the conversion characteristic curve 84 corresponds to a curve obtained by combining the first characteristic curve 80 and the second characteristic curve 82 illustrated in FIG. 5. A horizontal axis of the graph indicates a 12-bit detection value, while a vertical axis of the graph indicates a 10-bit conversion value. The conversion characteristic curve 84 exhibits a relation in which [1] the conversion value is the minimum value (0) when the detection value is equal to or less than D1, [2] the conversion value increases linearly when the detection value exceeds D1, and [3] the conversion value is the maximum value (1023) when the detection value is equal to or greater than D2.

Here, an inflection point Q1 (D1, 0) corresponds to a starting point of a rising edge in the conversion characteristic curve 84. An inflection point Q2 (D2, 0) corresponds to a starting point of saturation in the conversion characteristic curve 84. Hereafter, a range in which the inflection point Q1 is the lower limit and the inflection point Q2 is the upper limit is also referred to as an "effective range."

2. Update of Conversion Characteristic Curve 84

FIG. 7 is a diagram illustrating an example of temporal variation of the position of the electronic pen 12 when the electronic pen 12 is in use. Here, a region in which communication between the electronic pen 12 and the electronic device 14 is not possible is referred to as a "communication-disabled region 90," while a region in which communication between the electronic pen 12 and the electronic device 14 is possible is referred to as a "communication-enabled region 92." When the user performs a handwriting input, the user brings the pen tip close to a touch surface of the electronic device 14 while holding the electronic pen 12. When the electronic pen 12 reaches a boundary position 94 between the communication-disabled region 90 and the communication-enabled region 92, the electronic pen 12 is able to receive an uplink signal US1. This event triggers the electronic pen 12 and the electronic device 14 to start a communication session.

The communication session described above continues while the electronic pen 12 is within the communication-enabled region 92. When the electronic pen 12 is in a "contact state" in which the pen tip of the electronic pen 12 is in contact with a sensor surface, the reception strength of the electronic pen 12 is at its maximum. As the pen tip moves away from the sensor surface, the reception strength of the electronic pen 12 decreases. In the example of FIG. 7, the reception strength of an uplink signal US2 is greater than that of the uplink signal US1.

When the user stops or ends the handwriting input, the user moves the pen tip away from the touch surface of the electronic device 14 while holding the electronic pen 12. When the electronic pen 12 reaches the boundary position 94, the electronic pen 12 can no longer receive an uplink signal US3. This event triggers the electronic pen 12 and the electronic device 14 to end the communication session.

An example of an operation of updating the conversion characteristic curve 84 by the control circuit 50 of FIGS. 3 and 4 is described with reference to a flowchart illustrated in FIG. 8 as well as FIG. 9. At the start of this flowchart, the communication session between the electronic pen 12 and the electronic device 14 has not yet started.

Figure 8:
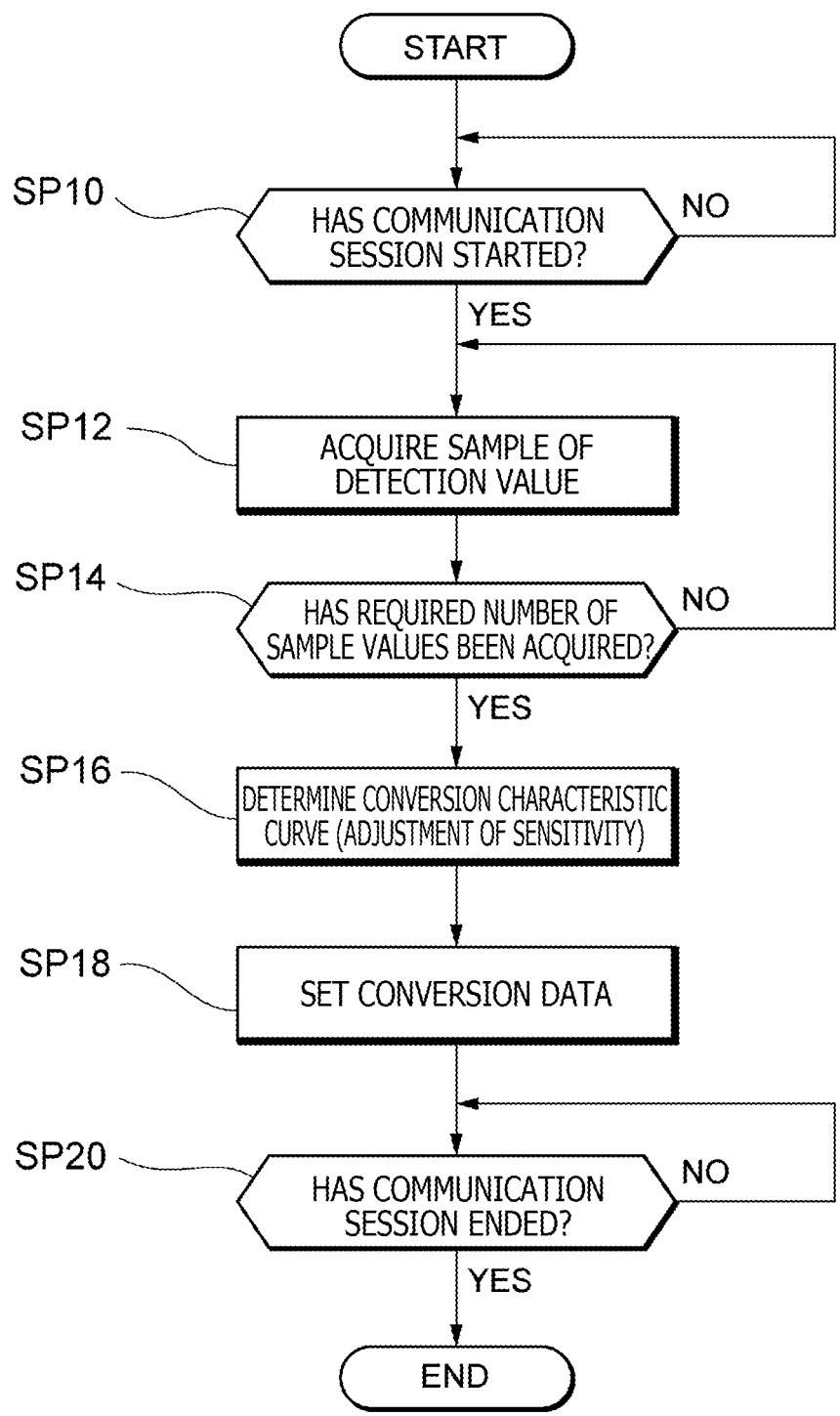
FIG. 8 is a flowchart illustrating an example of an operation of updating the conversion characteristic curve by the control circuit illustrated in FIGS. 3 and 4.

At step SP10 of FIG. 8, the mode control circuit 66 checks whether or not the communication session between the electronic pen 12 and the electronic device 14 has started, by referring to the reception strength acquired by the strength acquisition circuit 64. When the start of the communication session has not been confirmed (step SP10: NO), the mode control circuit 66 remains at step SP10 until the start state. On the other hand, when the start of the communication session has been confirmed (step SP10: YES), the mode control circuit 66 switches the output destination of the mode switch 62 to the M1 terminal side (i.e., update mode) and then proceeds to the next step SP12.

At step SP12, the detection value acquisition circuit 60 processes the detection signal sequentially output from the pen pressure sensor 26 to acquire a sample of a detection value (i.e., a sample value) and supplies the sample value to the characteristic update circuit 70 via the mode switch 62.

At step SP14, the characteristic update circuit 70 checks whether or not the number of (e.g., N) sample values required for determining the conversion characteristic curve 84 has been acquired. When the required number of sample values has not yet been acquired (step SP14: NO), the characteristic update circuit 70 returns to step SP12 and repeats steps SP12 and SP14 sequentially until the required number of sample values can be acquired. On the other hand, when the required number of sample values has been acquired (step SP14: YES), the characteristic update circuit 70 proceeds to the next step SP16.

At step SP16, the characteristic update circuit 70 determines the conversion characteristic curve 84 for the current communication session, by using the plurality of sample values sequentially acquired at step SP12. Specifically, the characteristic update circuit 70 calculates statistics for the plurality of sample values, determines the conversion characteristic curve 84 for this time based on the statistics, and generates the conversion data TD to identify this conversion characteristic curve 84.

Figure 9:
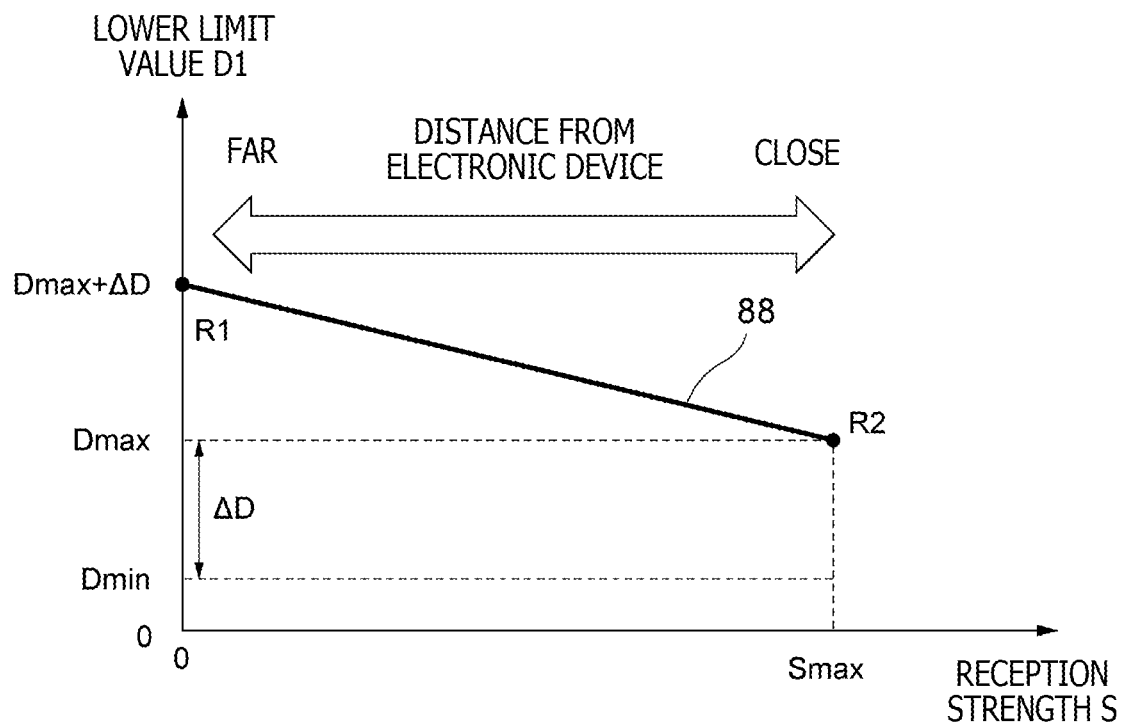
FIG. 9 is a diagram illustrating an example of a method for determining the conversion characteristic curve.

FIG. 9 is a diagram illustrating an example of a method for determining the conversion characteristic curve 84. The graph illustrated in FIG. 9 corresponds to a determination function 88 for determining the coordinates of the inflection point Q1 of FIG. 6, or in other words, a lower limit value (detection value D1) of the effective range. A horizontal axis of the graph indicates a reception strength S, while a vertical axis of the graph indicates the lower limit value (D1).

In the example of FIG. 9, the determination function 88 is a linear function connecting two points R1 and R2. The coordinates of R1 are (0, Dmax+Δ) and the coordinates of R2 are (Smax, Dmax) where Δ=Dmax−Dmin. Dmax is the maximum value of N sample values acquired at the start of the current communication session. Dmin is the minimum value of the N sample values acquired at the start of the current communication session. Smax is the maximum value of the reception strength S acquired while the electronic pen 12 is in the contact state in past communication sessions.

At step SP18 of FIG. 8, the value conversion circuit 68 sets the conversion characteristic curve 84 determined at step SP16. Specifically, the value conversion circuit 68 acquires the conversion data TD generated by the characteristic update circuit 70 and sets this conversion data TD to a usable state.

At step SP20, the mode control circuit 66 switches the output destination of the mode switch 62 to the M2 terminal side (corresponding to the "conversion mode"), analyzes the temporal variation of the reception strength acquired by the strength acquisition circuit 64, and checks whether or not the communication session between the electronic pen 12 and the electronic device 14 has ended. When the end of the communication session has not been confirmed (step SP20: NO), the mode control circuit 66 remains at step SP20 until the end state. On the other hand, when the end of the communication session has been confirmed (step SP20: YES), the mode control circuit 66 ends the flowchart illustrated in FIG. 8.

3. Dynamic Adjustment of Pen Pressure Sensitivity

Next, a method of dynamic adjustment of pen pressure sensitivity by the value conversion circuit 68 is described with reference to FIGS. 10 to 12.

Figure 10:
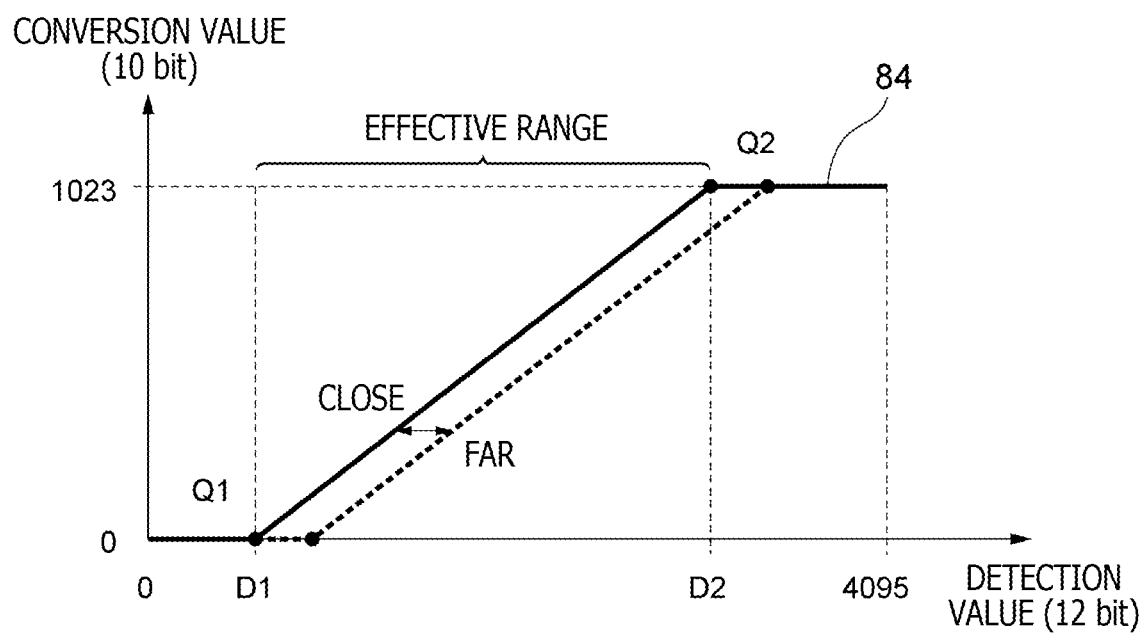
FIG. 10 is a diagram illustrating a first example of a method of dynamic adjustment of pen pressure sensitivity.

FIG. 10 is a diagram illustrating a first example of the method of dynamic adjustment of the pen pressure sensitivity. A horizontal axis of the graph illustrated in FIG. 10 indicates the detection value while a vertical axis of the graph indicates the conversion value. The amount of offset of the conversion characteristic curve 84 is adjusted according to the reception strength (or height position) of the electronic pen 12, so that the effective range moves parallel to the direction of the horizontal axis while the width of the effective range remains the same.

For example, as the electronic pen 12 moves away from the electronic device 14, the effective range of the conversion characteristic curve 84 moves parallel to the right (in the direction away from the origin), so that the rising sensitivity of the amount of pen pressure decreases. This can suppress occurrence of a phenomenon (what is generally called "ink leakage") in which drawing is performed despite the fact that the electronic pen 12 is in a hovering state.

On the other hand, as the electronic pen 12 approaches the electronic device 14, the effective range of the conversion characteristic curve 84 moves parallel to the left (in the direction closer to the origin), so that the rising sensitivity of the amount of pen pressure increases. This can speed up the response of drawing by the electronic pen 12.

Figure 11:
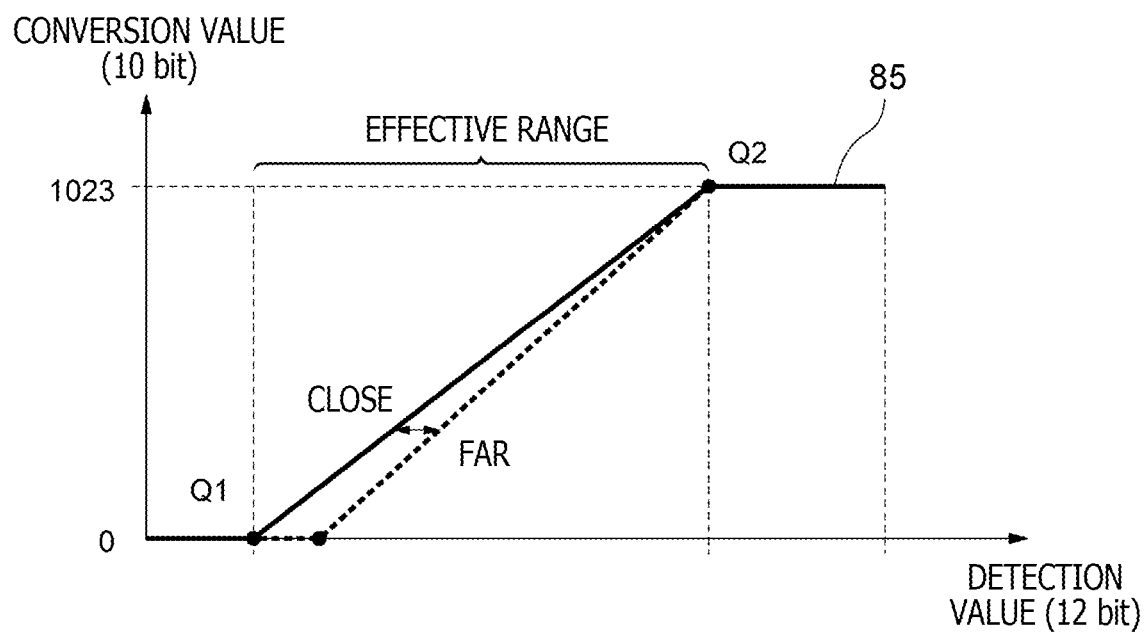
FIG. 11 is a diagram illustrating a second example of the method of dynamic adjustment of the pen pressure sensitivity.

FIG. 11 is a diagram illustrating a second example of the method of dynamic adjustment of the pen pressure sensitivity. A horizontal axis of the graph illustrated in FIG. 11 indicates the detection value while a vertical axis of the graph indicates the conversion value. The amount of gain of the conversion characteristic curve 85 is adjusted according to the reception strength (or height position) of the electronic pen 12, so that the width of the effective range expands or reduces with the lower limit value of the effective range fixed.

For example, as the electronic pen 12 moves away from the electronic device 14, the width of the effective range of the conversion characteristic curve 85 expands to the right (in the direction away from the origin), so that the sensitivity of the amount of pen pressure in the entire effective range including the inflection point Q1 decreases. This can suppress the occurrence of a phenomenon (what is generally called "ink leakage") in which drawing is performed despite the fact that the electronic pen 12 is in the hovering state.

On the other hand, as the electronic pen 12 approaches the electronic device 14, the width of the effective range of the conversion characteristic curve 85 shrinks to the left (in the direction closer to the origin), so that the sensitivity of the amount of pen pressure in the entire effective range including the inflection point Q1 increases. This can speed up the response of drawing by the electronic pen 12.

Figure 12:
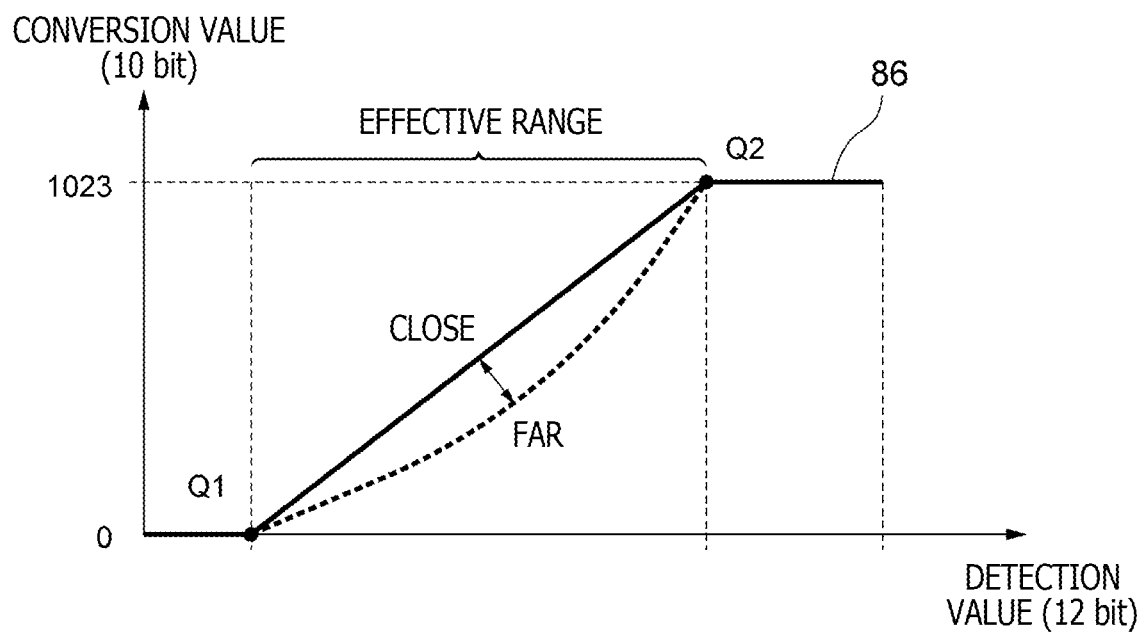
FIG. 12 is a diagram illustrating a third example of the method of dynamic adjustment of the pen pressure sensitivity.

FIG. 12 is a diagram illustrating a third example of the method of dynamic adjustment of the pen pressure sensitivity. A horizontal axis of the graph illustrated in FIG. 12 indicates the detection value while a vertical axis of the graph indicates the conversion value. A gamma value of the conversion characteristic curve 86 is adjusted according to the reception strength (or height position) of the electronic pen 12, so that the shape of the curve (i.e., the balance of the slope) changes with the upper and lower limit values of the effective range fixed.

For example, as the electronic pen 12 moves away from the electronic device 14, the gamma value increases, so that the sensitivity of the amount of pen pressure near the inflection point Q2 becomes relatively high while the sensitivity of the amount of pen pressure near the inflection point Q1 becomes relatively low. This can suppress the occurrence of a phenomenon (what is generally called "ink leakage") in which drawing is performed despite the fact that the electronic pen 12 is in the hovering state.

On the other hand, as the electronic pen 12 approaches the electronic device 14, the gamma value decreases, making the sensitivity of the amount of pen pressure in the entire effective range equalized. Hence, the sensitivity of the amount of pen pressure near the inflection point Q1 relatively increases. This can speed up the response of drawing by the electronic pen 12.

4. Description of Conversion Characteristic Curve 104

The above-described example illustrated in FIG. 5 assumes a case in which the detection value output from the pen pressure sensor 26 increases as the load (i.e., the amount of pen pressure) exerted on the pen tip increases. Depending on a detection method and structure of the pen pressure sensor 26, the correlation between the detection value and the amount of pen pressure may be different from the example illustrated in FIG. 5.

Figure 13:
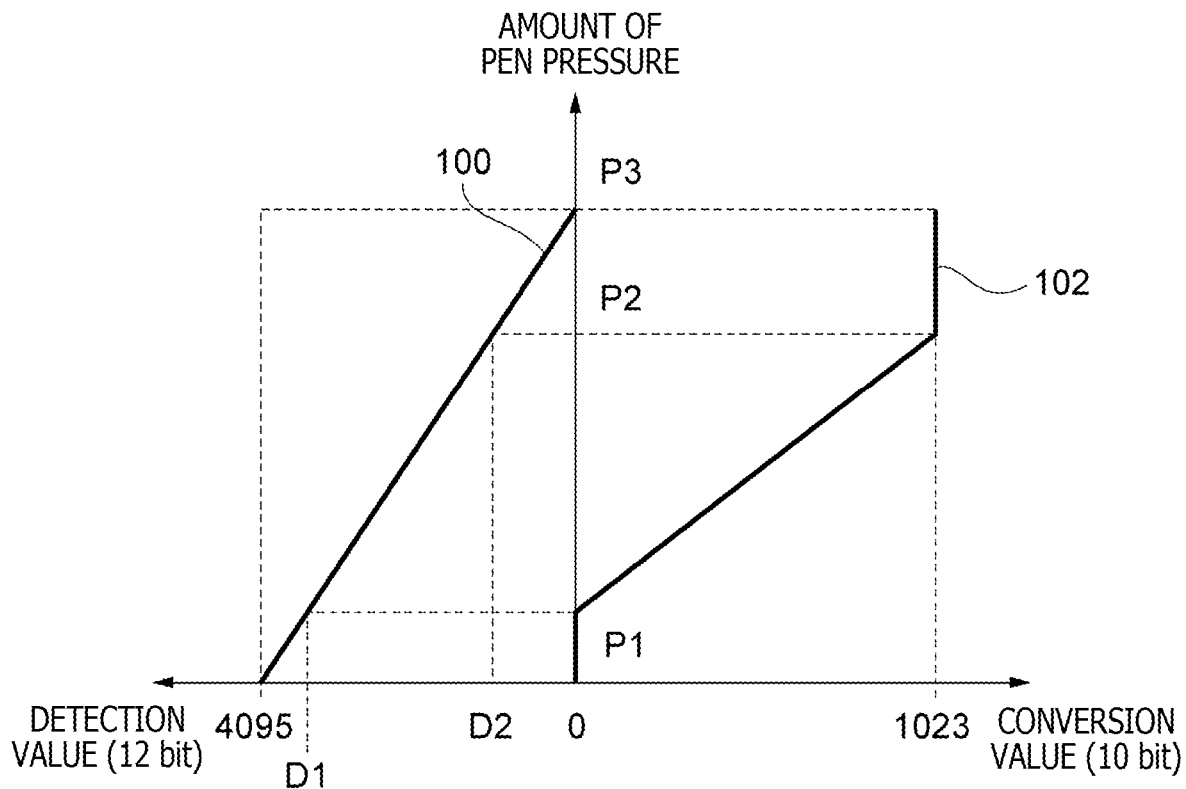
FIG. 13 is a diagram illustrating another example of the correspondence relation among the detection value, the conversion value, and the amount of pen pressure.

FIG. 13 is a diagram illustrating another example of the correspondence relation among the detection value, the conversion value, and the amount of pen pressure. Since the definitions of the first to third axes in the graph are the same as those of the graph in FIG. 5, the description thereof is omitted.

A first characteristic curve 100 is a curve related to the first axis (detection value) and the second axis (amount of pen pressure). In the example illustrated in FIG. 13, the first characteristic curve 100 exhibits a relation in which [1] the first characteristic curve 100 passes through a point (0, P3) and [2] the amount of pen pressure decreases generally linearly with respect to the detection value.

A second characteristic curve 102 is a curve related to the second axis (amount of pen pressure) and the third axis (conversion value). In the example illustrated in FIG. 13, the second characteristic curve 102 has the same shape as that of the second characteristic curve 82 illustrated in FIG. 5. Further, the amounts of pen pressure P1 to P3 are defined in the same way as those of FIG. 5.

Figure 14:
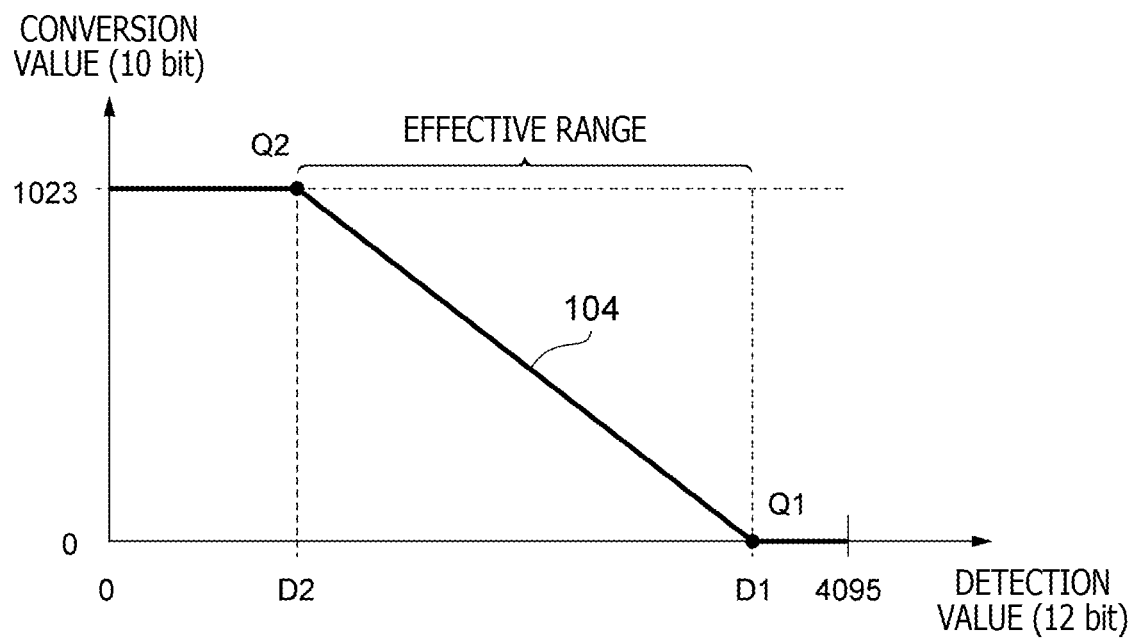
FIG. 14 is a diagram illustrating a conversion characteristic curve in the correspondence relation illustrated in FIG. 13.

FIG. 14 is a diagram illustrating a conversion characteristic curve 104 in the correspondence relation illustrated in FIG. 13. More specifically, the conversion characteristic curve 104 corresponds to a curve obtained by combining the first characteristic curve 100 and the second characteristic curve 102 illustrated in FIG. 13. The conversion characteristic curve 104 exhibits a relation in which [1] the conversion value is at the maximum value (1023) when the detection value is equal to or less than D2, [2] the conversion value decreases linearly when the detection value exceeds D2, and [3] the conversion value is at the minimum value (0) when the detection value is equal to or greater than D1. Here, the inflection point Q1 (D1, 0) corresponds to a starting point of a rising edge in the conversion characteristic curve 104. The inflection point Q2 (D2, 0) corresponds to a starting point of saturation in the conversion characteristic curve 104.

Even when the detection value output from the pen pressure sensor 26 decreases as the load (i.e., the amount of pen pressure) exerted on the pen tip increases, the value conversion circuit 68 can dynamically adjust the pen pressure sensitivity by using the conversion characteristic curve 104 illustrated in FIG. 14. The adjustment method is the same as the one in the first to third examples illustrated in FIGS. 10 to 12.

Advantageous Effects of Embodiment

As described above, the input system 10 according to the present embodiment includes the electronic device 14, which has the plane-shaped sensor 16, and the electronic pen 12, which indicates a position on the plane-shaped sensor 16 through communication with the electronic device 14. The electronic pen 12 includes the reception circuit 46, which receives a signal (in this case, the uplink signal US) transmitted from the electronic device 14, the pen pressure sensor 26, which outputs a detection signal correlated with the amount of pen pressure exerted on the pen tip, and the value conversion circuit 68, which converts, according to a conversion rule, a detection value indicated by the detection signal output from the pen pressure sensor 26, into a conversion value indicating the magnitude of the amount of pen pressure. The value conversion circuit 68 adjusts, according to the strength of the signal received by the reception circuit 46, the rising sensitivity at which the amount of pen pressure transitions from zero to non-zero on the conversion characteristic curve 84, 85, 86, or 104 identified by the conversion rule.

With the pen pressure adjustment method according to the present embodiment, the electronic pen 12 receives a signal transmitted from the electronic device 14, outputs a detection signal correlated with the amount of pen pressure exerted on the pen tip, converts, according to a conversion rule, a detection value indicated by the output detection signal into a conversion value indicating the magnitude of the amount of pen pressure, and adjusts, according to the strength of the received signal, the rising sensitivity at which the amount of pen pressure transitions from zero to non-zero on the conversion characteristic curve 84, 85, 86, or 104 identified by the conversion rule.

By adjusting the rising sensitivity according to the strength of the signal received by the reception circuit 46 in this way, unwanted ink rendering in the hovering state can be suppressed in a manner that is not affected by the specifications of the electronic device 14 that performs ink rendering.

The value conversion circuit 68 may relatively increase the rising sensitivity as the strength of the received signal increases, while relatively decreasing the rising sensitivity as the strength of the received signal decreases. This configuration can speed up the response of drawing in the contact state while suppressing ink leakage in the hovering state.

In the case where the conversion characteristic curve 84, 85, 86, or 104 is expressed on the coordinate system with the detection value as the first axis and the conversion value as the second axis, the value conversion circuit 68 may adjust the rising sensitivity by moving, along the first axis, the position of the inflection point at which the amount of pen pressure transitions from zero to non-zero. Alternatively, the value conversion circuit 68 may adjust the rising sensitivity by changing the slope at the inflection point at which the amount of pen pressure transitions from zero to non-zero. Further, the conversion value may be defined such that the amount of pen pressure increases linearly as the conversion value increases.

The electronic pen 12 may further include the characteristic update circuit 70, which updates the conversion characteristic curve 84, 85, 86, or 104. In this case, the value conversion circuit 68 adjusts the rising sensitivity on the conversion characteristic curve 84, 85, 86, or 104 updated by the characteristic update circuit 70. This configuration enables sensitivity adjustment of the amount of pen pressure according to the current state of the electronic pen 12.

The characteristic update circuit 70 may acquire a plurality of sample values, each of which is a sample of the detection value, and then determine and update the conversion characteristic curve 84, 85, 86, or 104 based on statistics related to the plurality of sample values. Accordingly, the conversion characteristic curve 84, 85, 86, or 104 in which the variation of the detection value is reflected can be acquired.

In the case where the conversion characteristic curve 84, 85, 86, or 104 is expressed on the coordinate system with the detection value as the first axis and the conversion value as the second axis, the detection value corresponding to the inflection point Q1 at which the amount of pen pressure transitions from zero to non-zero may be determined to be equal to or greater than the maximum value of a plurality of sample values, regardless of the strength of the received signal. This ensures that the lower limit value of the detection value is adjusted so as not to fall below the maximum value of the sample values, regardless of the condition of the reception from the electronic device 14.

The conversion characteristic curve 84, 85, 86, or 104 may be determined based on the maximum value of the strength of the received signal acquired by the reception circuit 46 in the past. Accordingly, the conversion characteristic curve 84, 85, 86, or 104 in which the maximum value of the reception strength is reflected can be acquired.

The plurality of sample values may represent a set of detection values each indicated by the detection signal sequentially output from the pen pressure sensor 26 while the strength of the received signal is smaller than a threshold value or a set of detection values each indicated by the detection signal sequentially output from the pen pressure sensor 26 upon the start of the communication session with the electronic device 14. This configuration can further reduce the influence of electrical noise caused by the signal received from the electronic device 14.

The characteristic update circuit 70 may update the conversion characteristic curve 84, 85, 86, or 104 for each communication session with the electronic device 14. With this configuration, the variation in the detection of the amount of pen pressure by the pen pressure sensor 26 can be adjusted for each communication session.

Modifications

The present disclosure is not limited to the embodiment described above, and it is a matter of course that changes can be made to the present disclosure without departing from the scope of the present disclosure. The configurations described in the embodiment may also freely be combined as long as no technical inconsistency arises.

Although the electronic pen 12 is described as an active electrostatic (AES) stylus in the embodiment described above, the electronic pen 12 may instead be an electromagnetic resonance (EMR) stylus. In this device configuration, an electronic device includes a plane-shaped sensor in which a plurality of loop coils are formed, while an electronic pen includes a reception circuit that receives a magnetic field signal output from the plane-shaped sensor.

Although the electronic pen 12 receives a signal through communication using capacitive coupling with the plane-shaped sensor 16 of the electronic device 14 and adjusts the rising sensitivity according to the strength of the received signal in the embodiment described above, the communication method is not limited thereto. For example, the strength of the received signal acquired through another wireless communication method such as Bluetooth (registered trademark) may be used.

The invention claimed is:

1. An electronic pen that indicates a position on a plane-shaped sensor through communication with an electronic device including the plane-shaped sensor, the electronic pen comprising:
    a reception circuit configured to receive a signal transmitted from the electronic device;
    a pen pressure sensor configured to output a detection signal correlated with an amount of pen pressure exerted on a pen tip of the electronic pen; and
    a value conversion circuit configured to convert, according to a conversion rule, a detection value indicated by the detection signal output from the pen pressure sensor, into a conversion value indicating a magnitude of the amount of pen pressure,
    wherein the value conversion circuit adjusts, according to a strength of the signal received by the reception circuit, rising sensitivity at which the amount of pen pressure transitions from zero to non-zero on a conversion characteristic curve identified by the conversion rule, where the conversion characteristic curve is expressed on a coordinate system with the detection value as a first axis and the conversion value as a second axis.

2. The electronic pen according to claim 1, wherein the value conversion circuit relatively increases the rising sensitivity as the strength of the received signal increases, while relatively decreasing the rising sensitivity as the strength of the received signal decreases.

3. The electronic pen according to claim 1, wherein the value conversion circuit adjusts the rising sensitivity by moving, along the first axis, a position of an inflection point at which the amount of pen pressure transitions from zero to non-zero.

4. The electronic pen according to claim 1, wherein the value conversion circuit adjusts the rising sensitivity by changing a slope at an inflection point at which the amount of pen pressure transitions from zero to non-zero.

5. The electronic pen according to claim 1, wherein the conversion value is defined such that the amount of pen pressure increases linearly as the conversion value increases.

6. The electronic pen according to claim 1, further comprising:
    a characteristic update circuit configured to update the conversion characteristic curve,
    wherein the value conversion circuit adjusts the rising sensitivity on the conversion characteristic curve updated by the characteristic update circuit.

7. The electronic pen according to claim 6, wherein the characteristic update circuit acquires a plurality of sample values, each of which is a sample of the detection value, and determines and updates the conversion characteristic curve based on statistics related to the plurality of sample values.

8. The electronic pen according to claim 7, wherein the conversion characteristic curve is determined such that the detection value corresponding to an inflection point at which the amount of pen pressure transitions from zero to non-zero is equal to or greater than a maximum value of the plurality of sample values, regardless of the strength of the received signal.

9. The electronic pen according to claim 7, wherein the conversion characteristic curve is determined based on a maximum value of the strength of the received signal acquired by the reception circuit in a past.

10. The electronic pen according to claim 7, wherein the plurality of sample values represent a set of detection values each indicated by the detection signal sequentially output from the pen pressure sensor while the strength of the received signal is smaller than a threshold value.

11. The electronic pen according to claim 7, wherein the plurality of sample values represent a set of detection values each indicated by the detection signal sequentially output from the pen pressure sensor upon a start of a communication session with the electronic device.

12. The electronic pen according to claim 6, wherein the characteristic update circuit updates the conversion characteristic curve for each communication session with the electronic device.

13. An input system comprising:
an electronic device including a plane-shaped sensor; and
an electronic pen that indicates a position on the plane-shaped sensor through communication with the electronic device,
wherein the electronic pen includes:
a reception circuit configured to receive a signal transmitted from the electronic device,
a pen pressure sensor configured to output a detection signal correlated with an amount of pen pressure exerted on a pen tip of the electronic pen, and
a value conversion circuit configured to convert, according to a conversion rule, a detection value indicated by the detection signal output from the pen pressure sensor, into a conversion value indicating a magnitude of the amount of pen pressure, and
the value conversion circuit adjusts, according to a strength of the signal received by the reception circuit, rising sensitivity at which the amount of pen pressure transitions from zero to non-zero on a conversion characteristic curve identified by the conversion rule, where the conversion characteristic curve is expressed on a coordinate system with the detection value as a first axis and the conversion value as a second axis.

14. A pen pressure adjustment method related to an electronic pen that indicates a position on a plane-shaped sensor through communication with an electronic device including the plane-shaped sensor, the pen pressure adjustment method comprising:
by the electronic pen,
receiving a signal transmitted from the electronic device;
outputting a detection signal correlated with an amount of pen pressure exerted on a pen tip of the electronic pen;
converting, according to a conversion rule, a detection value indicated by the output detection signal into a conversion value indicating a magnitude of the amount of pen pressure; and
adjusting, according to a strength of the received signal, rising sensitivity at which the amount of pen pressure transitions from zero to non-zero on a conversion characteristic curve identified by the conversion rule, where the conversion characteristic curve is expressed on a coordinate system with the detection value as a first axis and the conversion value as a second axis.

* * * * *